Figure 2:
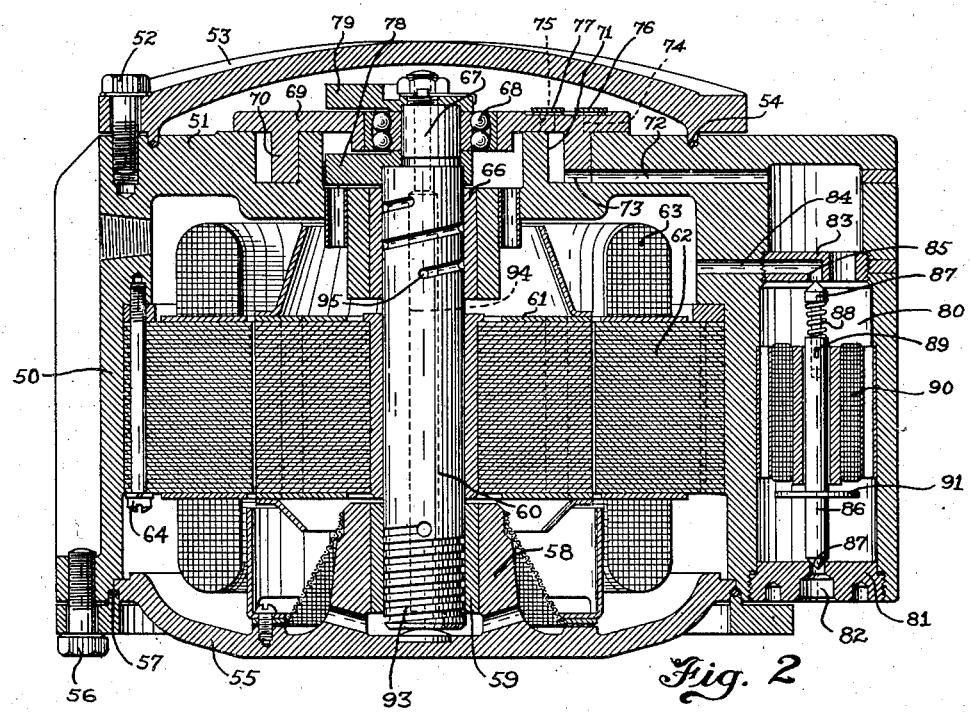

Nov. 24, 1936.　　　E. L. HORLACHER　　　2,062,052

MOTOR COMPRESSOR UNIT FOR REFRIGERATING APPARATUS

Filed June 30, 1932

Inventor

Elmer L. Horlacher

By Spencer Hardman and Fehr
Attorneys

Patented Nov. 24, 1936

2,062,052

UNITED STATES PATENT OFFICE 2,062,052

MOTOR-COMPRESSOR UNIT FOR REFRIGERATING APPARATUS

Elmer L. Horlacher, Dayton, Ohio, assignor, by mesne assignments, to General Motors Corporation, a corporation of Delaware Application June 30, 1932, Serial No. 620,195

6 Claims. (Cl. 230—24)

This invention relates to refrigerating apparatus and more particularly to unloading means for motor-compressor units.

In order to facilitate starting, it is common to provide motor compressor units with unloading means.

An object of my invention is to provide a motor-compressor unit having an unloading chamber, a by-pass, and a single electro-magnet valve means which closes the entrance to the unloading chamber and opens a by-pass with a single movement when the compressor stops, and which, with a single movement, opens the entrance to the unloading chamber and closes the by-pass when the compressor starts or reaches a predetermined speed range.

Another object of my invention is to provide a motor-compressor unit having an electro-magnetic unloading means controlled by a separate exciting winding in the electric motor.

Further objects and advantages of the present invention will be apparent from the following description, reference being had to the accompanying drawing, wherein a preferred form of the present invention is clearly shown.

Figure 1:
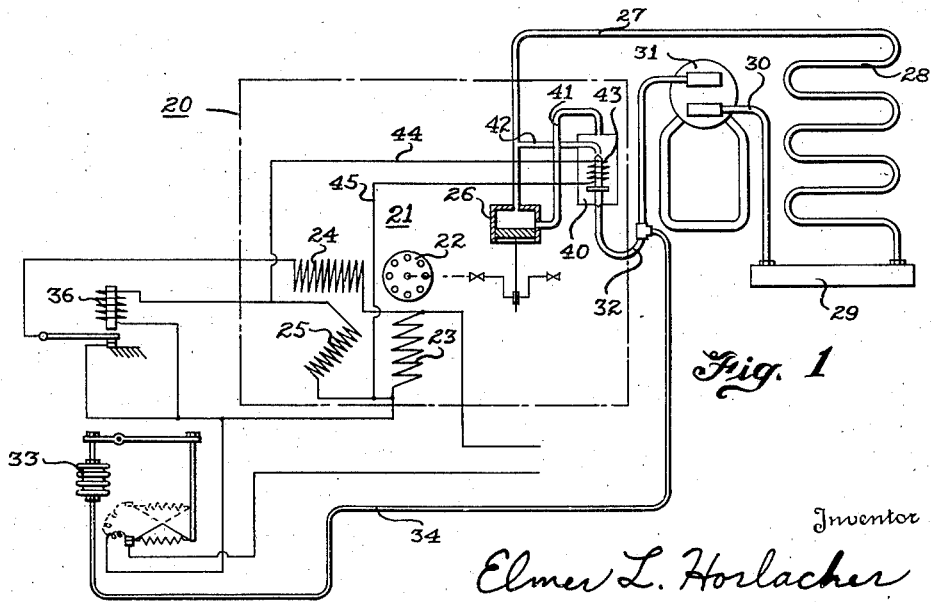

In the drawing:

Fig. 1 is a diagrammatic illustration of one form of my invention showing a sealed electric motor compressor unit together with the remaining elements of a refrigeration system; and Fig. 2 is a sectional view of the motor compressor unit showing my electro-magnetic unloading means.

Referring to the drawing and more particularly to Fig. 1, there is shown diagrammatically a sealed motor compressor unit 20 containing an electric motor 21 having a rotor 22. The motor preferably is provided with the usual running winding 23 and starting winding 24. A winding inductively excited by the rotation of the motor is provided for actuating an unloading mechanism, and this winding preferably may be in the form of a separate exciting winding 25. The starting and running windings 24 and 23, as well as the separate exciting winding 25 are all suitably wound in the stator portion of the motor 21. The separate exciting winding is in inductive relation with the rotor and the starting and running windings. By reason of this inductive relation, electric energy is generated when the motor operates. It is to be understood, however, that if desired, the separate exciting winding may be made separate from the motor proper and in inductive relation to separate means rotated by the motor for generating electrical energy within the separate exciting winding. The rotor 22 is preferably directly connected to a compressor 26, shown diagrammatically, where the refrigerant is compressed and forwarded through the conduit 27 to a condenser 28 where the refrigerant is liquefied and collected in the receiver 29. From the receiver 29 the liquid refrigerant is forwarded through a supply conduit 30 to an evaporator 31 of the float controlled type which controls the admission of liquid refrigerant in accordance with the level of liquid refrigerant within the evaporator. The liquid refrigerant within the evaporator 31 vaporizes because of the absorption of heat and is returned to the compressor through the return conduit 32. The operation of the motor compressor unit is controlled by a snap acting low pressure switch 33 which is connected to the return conduit 32 by a conduit 34. The low pressure switch 33 controls the operation of the motor compressor unit in accordance with the pressure and consequently the temperature of the evaporator 31.

A starting relay 36 is provided for opening the starting winding circuit when the motor 21 reaches a certain predetermined speed. This starting relay 36 is energized by current from the separate exciting winding 25. The separate exciting winding 25 has electric energy generated therein during the operation of the electric motor which varies in voltage with the speed of the motor, but ordinarily not in a direct relation thereto. The starting relay is so adjusted that when the proper voltage is generated by the separate exciting winding 25 at the predetermined desired tripping speed of the motor, the starting relay 36 will open the starting winding circuit and cause the starting winding thereafter to be ineffective.

In order to facilitate the starting of the motor compressor unit and to reduce the amount of starting torque required, I provide an improved unloading means for the compressor. One of the elements of this unloading means is an unloading chamber 40 to which the return conduit 32 is connected. The unloading chamber 40 is also connected to the compressor by the inlet passage 41. A by-pass 42 connects the unloading chamber with the discharge side of the compressor. Within the unloading chamber 40 there is provided an electro-magnetic valve means 43 which, when de-energized, is adapted to close the entrance to the unloading chamber 40 from the suction or return conduit 32. At the same time the valve means will open the by-pass 42 so that the high pressure gas from the discharge side of the compressor will fill the unloading chamber 40 during idle periods of the compressor so that the pressure upon the intake and discharge side of the compressor will be equalized.

The electro-magnetic valve means 43 is connected by electrical conductors 44 and 45 to the separate exciting winding 25. After the compressor starts the gas will be pumped from the unloading chamber 43 to the discharge side of the compressor but since the by-pass 42 is open, the pressure will remain the same on both sides of the compressor and only sufficient work will be done by the electric motor to overcome the friction of the compressor. As the speed of the motor 21 increases, the voltage generated in the separate exciting winding 25 will increase and finally become of sufficient amount to actuate the electro-magnetic valve means 43 to close the by-pass 42 and to open the entrance to the unloading chamber 40. After this takes place, the compressor will then draw refrigerant from the unloading chamber 40 and from the return or suction conduit 32 as has been customary.

The construction of the motor-compressor unit together with the electro-magnet unloading means is shown in Fig. 2. In Fig. 2 there is shown a housing 50 which is generally cylindrical in shape but having a thick web 51 across the top thereof. Fastened to the top of the housing 50 by means of cap screws 52 is a top cover 53 which is sealed by means of a suitable lead gasket 54. At the bottom of the housing 50 there is provided a bottom plate 55 which is also fastened to the housing by means of cap screws 56 and sealed by means of a suitable lead gasket 57. The bottom plate is provided with an upstanding boss 58 containing a bearing 59 which supports the lower end of a vertical rotor shaft 60.

Mounted upon the rotor shaft 60 is a rotor 61 of the squirrel cage type which is surrounded by a stator 62 which is mounted upon and within the walls of the housing 50 by the long screws 64. The stator 62 has wound thereon the running, starting and the separate exciting winding designated in general by the reference character 63.

At the upper side of the rotor 61 there is provided a bearing 66 which is fixed within the web 51 of the housing 50. The bearing 66 supports the upper end of the rotor shaft 60. The upper end of the rotor shaft 60 is provided with an eccentric portion 67 upon which is fitted a ball bearing 68. Upon the outer portion of the ball bearing 68, there is fitted a disk-shaped gyrator 69 which has an annular ring 70 depending from its lower surface which fits into an annular groove 71 in the web 51 of the housing 50. A suction passage 72 leads vaporized refrigerant to the outer side of the annular groove 71. The passage 73 through the ring 70 of the gyrator 69 is provided to feed the refrigerant to the space in the annular groove 71 on inner side of the ring 70. As the motor rotates the oscillating ring 70 draws vaporized refrigerant into the annular groove 71 and carries and compresses the refrigerant around the groove to the discharge ports 74 and 75 which are provided with check valves 76 and 77 of the flapper valve type. The inlet passages 72 and 73 are separated from the discharge ports 74 and 75 by a divider block, not shown. In order to balance the unbalanced mass of the eccentric 67, the ball bearing 68 and the gyrator 69, the counter-balances 78 and 79 are provided.

The compressor housing 50 is provided with an ample charge of lubricant which ordinarily collects upon the bottom plate 55. The bottom portion of the rotor shaft 60 is provided with a spiral groove 93 which feeds the lubricant during the operation of the compressor to a drilled passage 94 within the rotor shaft 60. The drilled passage 94 conducts lubricant to the top of the rotor shaft 60 and from this point the lubricant flows over the gyrator 69 and over the ball bearing 68 to provide adequate lubrication for the compressor. An upper spiral groove 95 connects with the drilled passage 94 to provide lubrication for the upper bearing 66.

Within the housing 50, at one side thereof, there is provided an unloading chamber 80. At the bottom of the unloading chamber 80 there is a plug 81 which has an entry passage 82 adapted to be connected to the return conduit 32. The suction passage 72 connects to the upper portion of the unloading chamber 80. Within the unloading chamber 80 there is provided a valve plate 83. A by-pass 84 extends from the interior of the housing 50 to the valve plate 83. A valve seat 85 is provided in the valve plate 83 at the entrance of this by-pass 84 into the unloading chamber 80.

Within the unloading chamber 80 there is provided an electro-magnetic valve means comprising a double-ended valve 86 having a needle valve 87 at its lower end for closing the entrance 82 of the unloading chamber 80 and having at its upper end a needle valve 88 which is yieldingly mounted by means of a spring 88. A pin and slot means 89 controls the amount of movement permitted between the upper needle valve 87 and the main portion 86 of the double-ended valve. The double-ended valve 86 is preferably made of a suitable magnetic material such as soft iron. Surrounding the double-ended valve 86 there is provided an electro-magnetic coil 90. When the coil 90 is not energized, the valve 86 falls by gravity, and the needle valve 87 at its lower end closes the entrance 82 to the unloading chamber 80 while the needle valve 87 at its upper end uncovers the by-pass 84. This permits the high pressure gas in the interior of the housing 50 to flow into the unloading chamber 80 and equalize the pressure upon both sides of the compressor. When the motor starts and attains sufficient speed, the separate exciting coil will supply sufficient electrical energy and at a proper voltage to cause the electro-magnetic coil 90 to exert sufficient attraction upon the double-ended valve so as to lift the valve to close the by-pass 84 at the proper time and to open the entrance 82 to the unloading chamber 80. A disc 91 of soft iron is provided on the double-ended valve 86 in order to increase the effectiveness of the electro-magnet 90. In this way, the starting of the motor compressor unit is facilitated but after the motor acquires sufficient speed, the motor compressor unit will operate under full load.

While I disclose as a preferred embodiment, a motor-compressor unit of the sealed unit type having a gyrator ring compressor, it is to be understood that such an illustration is merely for the purpose of illustrating my invention, and that my invention is applicable to other types of motor-compressor units, such as the ordinary reciprocating type as well. The starting relay 36 and the electro-magnetic valve means 43 are shown connected in parallel to the separate exciting winding 25, but, if desired, these may be connected in series with the separate exciting winding 25. If desired, the electro-magnet unloading valve may be energized by current in either the main or the starting winding of the electric motor 29.

While the form of embodiment of the invention as herein disclosed constitutes a preferred form, it is to be understood that other forms might be adopted, all coming within the scope of the claims which follow.

What is claimed is as follows:

1. An intermittently operating motor compressor unit including a compressor and a single phase induction type electric motor for driving the compressor, said electric motor having a stator with a starting and running winding wound thereon, an unloading means for said compressor, and a third winding separated from the starting and running windings but wound therewith upon the stator, said third winding being inductively excited by the windings of the motor for controlling said unloading means.

2. An intermittently operating motor-compressor unit including a compressor driven by a single phase induction type electric motor, a starting relay for said electric motor, an electromagnetic unloading means for said compressor, and a winding inductively excited by the windings of the motor and in which the voltage increases with the speed for supplying electric energy to said starting relay and said electromagnetic unloading means.

3. An intermittently operating motor-compressor unit including a compressor having an intake and a discharge portion and an induction type electric motor for driving the compressor, a valve for closing the intake portion of the compressor, and electromagnetic means for opening said valve when said motor-compressor unit attains a certain speed including a separate winding inductively excited by the windings of the electric motor.

4. An intermittently operating motor-compressor having an intake portion with a capacity chamber connected thereto and a discharge portion, said capacity chamber having an inlet, an induction type electric motor for driving the compressor, an inlet valve for closing the inlet to the capacity chamber, a by-pass between the capacity chamber and the discharge portion, a by-pass valve for closing said by-pass, and electromagnetic means for opening said inlet valve and closing the by-pass valve when the motor attains a certain speed including a separate winding inductively excited by the windings of the electric motor.

5. An intermittently operating motor-compressor unit including a compressor driven by a single phase induction type electric motor, an unloading means for said compressor, and a winding separate from the windings of the motor but inductively excited by the windings of the motor in which the voltage increases with the speed for controlling said unloading means.

6. An intermittently operating motor compressor unit including a compressor and a single phase induction type electric motor for driving the compressor, said electric motor having a stator with a running and a starting winding wound thereon, a by-pass connecting the intake and discharge sides of said compressor, an electromagnetic valve means capable of closing said by-pass, and a third winding wound upon said stator but separate from the running winding inductively excited by the windings of the motor for operating said electromagnetic valve means.

ELMER L. HORLACHER.